(12) United States Patent
Henke

(10) Patent No.: US 10,166,610 B2
(45) Date of Patent: Jan. 1, 2019

(54) COMPENSATION CHUCK FOR CENTRICALLY CLAMPING WORKPIECES

(71) Applicant: Volker Henke, Oyten (DE)

(72) Inventor: Volker Henke, Oyten (DE)

(73) Assignee: HVM Technology GmbH, Oyten (DE)

( * ) Notice: Subject to any disclaimer, the term of this patent is extended or adjusted under 35 U.S.C. 154(b) by 0 days.

(21) Appl. No.: 15/551,358

(22) PCT Filed: Feb. 18, 2016

(86) PCT No.: PCT/EP2016/053416
§ 371 (c)(1),
(2) Date: Aug. 16, 2017

(87) PCT Pub. No.: WO2016/142142
PCT Pub. Date: Sep. 15, 2016

(65) Prior Publication Data
US 2018/0029139 A1 Feb. 1, 2018

(30) Foreign Application Priority Data
Mar. 12, 2015 (DE) .......................... 10 2015 204 502

(51) Int. Cl.
*B23B 31/177* (2006.01)
(52) U.S. Cl.
CPC .... *B23B 31/16233* (2013.01); *B23B 2231/22* (2013.01); *B23B 2231/30* (2013.01);
(Continued)
(58) Field of Classification Search
CPC ........ B23B 31/16233; B23B 31/16254; B23B 2231/22; B23B 2231/30;
(Continued)

(56) References Cited

U.S. PATENT DOCUMENTS

| 2,921,796 A | 1/1960 | Ernest |
| 3,082,015 A * | 3/1963 | Hohwart ................. B23B 31/18 |
| | | 279/106 |

(Continued)

FOREIGN PATENT DOCUMENTS

| DE | 4016527 A1 | 12/1990 |
| DE | 102013201231 B3 | 2/2014 |

(Continued)

OTHER PUBLICATIONS

International Searching Authority, Search Report and Written Opinion issued in International Application No. PCT/EP2016/053416 dated May 10, 2016 (13 pages).

(Continued)

*Primary Examiner* — Eric A Gates
(74) *Attorney, Agent, or Firm* — Wood Herron & Evans LLP

(57) ABSTRACT

A compensation chuck for centrically clamping workpieces includes a housing, two pairs of mutually diametrally opposite base jaws for receiving corresponding clamping jaws, and a drive unit which is moveable preferably by power clamping having two pairs of drivable entrainment members. Two adjacent entrainment members are respectively coupled together by a first rocker and two further adjacent entrainment members are coupled together by a second rocker. There is also provided a coupling ring which guides a first entrainment member and a diametrally opposite second entrainment member in the peripheral direction tangentially relative to the clamping axis, such that a motion play is provided between the entrainment members and the coupling ring in the radial direction.

14 Claims, 6 Drawing Sheets

(52) U.S. Cl.
CPC .... *Y10T 279/1953* (2015.01); *Y10T 279/1973* (2015.01); *Y10T 279/25* (2015.01)

(58) Field of Classification Search
CPC ........... Y10T 279/17717; Y10T 279/19; Y10T 279/1926; Y10T 279/1953; Y10T 279/1961; Y10T 279/1973
See application file for complete search history.

(56) References Cited

U.S. PATENT DOCUMENTS

| | | | | |
|---|---|---|---|---|
| 4,243,236 | A * | 1/1981 | Rohm | B23B 31/16245 279/110 |
| 4,938,491 | A * | 7/1990 | Sumenko | B23B 31/16045 279/121 |
| 6,206,382 | B1 * | 3/2001 | Gonnocci | B23B 31/18 279/132 |
| 6,460,862 | B1 * | 10/2002 | Shimizu | B23B 31/16029 279/132 |
| 6,655,699 | B2 * | 12/2003 | Grobbel | B23B 31/18 279/118 |
| 7,036,827 | B2 * | 5/2006 | Mandokoro | B23B 31/16 279/118 |
| 9,156,092 | B2 * | 10/2015 | Karlein | B23B 31/16 |
| 2015/0352642 | A1 * | 12/2015 | Meyer | B23B 31/16 279/4.12 |

FOREIGN PATENT DOCUMENTS

| | | | | |
|---|---|---|---|---|
| DE | 102015104058 | B3 * | 6/2016 | ....... B23B 31/16045 |
| EP | 0400533 | A1 | 12/1990 | |
| JP | H01503048 | A | 10/1989 | |
| WO | 8000427 | A1 | 3/1980 | |
| WO | 2011137884 | A1 | 11/2011 | |

OTHER PUBLICATIONS

Japanese Patent Office, Office Action issued in JP Application No. 2017-547461 dated Aug. 31, 2018 (and English language translation) 9 pages.

* cited by examiner

COMPENSATION CHUCK FOR CENTRICALLY CLAMPING WORKPIECES

CROSS-REFERENCE TO RELATED APPLICATIONS

This application is a national phase entry of International Patent Application No. PCT/EP2016/053416, filed on Feb. 18, 2016, which claims priority to German Application No. 102015204502.1, which was filed Mar. 12, 2015. These prior applications are incorporated herein by reference in their entireties.

TECHNICAL FIELD

The present invention concerns a compensation chuck for centrically clamping workpieces. In particular the invention concerns a compensation chuck comprising a housing, two pairs of mutually diametrally opposite base jaws for receiving corresponding clamping jaws, a drive unit which is moveable preferably by power clamping having two pairs of drivable entrainment members, wherein two adjacent entrainment members are respectively coupled together by means of a first rocker and two further adjacent entrainment members are coupled together by means of a second rocker.

BACKGROUND

The term compensation chuck is used to denote a clamping chuck which by virtue of an unequal movement of its clamping jaws is capable of clamping even workpieces which are not perfectly cylindrical or symmetrical but deviate from a strictly symmetrical shape. The state of the art discloses for example three jaw chucks or six jaw chucks which can provide for limited compensation between the clamping jaws by way of pendulum bridges and similar mechanisms. Basically it is to be noted that any workpiece is elastically deformed by being clamped in a clamping chuck. The elastic deformation means that a workpiece which is machined in a clamped condition, after being removed from the chuck, no longer exactly corresponds in its shape, by virtue of the elastic return deformation, to the state in which it was during the clamped condition.

That deformation is correspondingly more pronounced, the fewer clamping jaws are used for clamping the workpiece. For that reason four-jaw chucks which the present invention involves are viewed as being advantageous over three jaw chucks because they permit more uniform clamping of the workpiece. Centric clamping of workpieces is a central aspect in the case of four-jaw chucks, by virtue of the static over-determination with four jaws, and that aspect is to be taken into consideration in design. To ensure a sufficiently high level of reproduction accuracy and reliability in terms of clamping it is a matter of substantial significance that the chuck always clamps the workpieces in relation to the same center point—and thus centrically. There are various approaches for affording centricity. For example a compensation chuck is known from the publication DE 10 2013 201 231 B3, which ensures centric clamping by means of a guidingly supported drive slider.

The publication WO 2011/137884 A1 discloses for example a compensation chuck. The compensation chuck of the foregoing kind as referred to in the opening of this specification endeavors to ensure centricity of the clamping operation by means of a coupling swing drive. That approach is disadvantageously viewed as being susceptible to trouble by virtue of its complexity. In addition unfavorable lever ratios involve adverse effects on the efficiency in terms of force transmission.

Therefore the object of the invention was to improve a compensation chuck of the kind set forth in the opening part of this specification in such a way that centricity in clamping is improved while chuck assembly complication alleviated as far as possible.

SUMMARY

In a compensation chuck of the kind set forth in the opening part of this specification the invention attains that object. In particular the invention proposes that the compensation chuck has a coupling ring which guides a first entrainment member and a diametrally opposite second entrainment member in the peripheral direction tangentially relative to the clamping axis, wherein a motion play is provided between the entrainment members and the coupling ring in the radial direction. The invention makes use of the realization that synchronization of the pivotal movement of the first and second rockers primarily contributes to ensuring centricity. That purely rotational synchronization task is isolated from radial guidance of the entrainment members by means of the coupling ring according to the invention so that that guidance effect can be ensured by other parts while the coupling ring according to the invention is concerned exclusively with guiding the rockers (by means of the diametrally opposite entrainment members) in the direction of rotation. By virtue of the fact that a motion play is afforded between the entrainment members and the coupling ring in the radial direction with respect to the clamping axis of the coupling ring, the occurrence of static over-determination and redundancy is at least restricted and assembly is markedly facilitated by virtue of reduced component complexity.

An advantageous development of the invention provides that the coupling ring is arranged in the housing rotatable about the clamping axis. Preferably the coupling ring has a first preferably radially oriented arm engaging into an opening in the first entrainment member and a second preferably radially oriented arm engaging into an opening in the second entrainment member. The opening in the respective entrainment member is preferably in the form of a pocket, within which the entrainment member can slide in the radial direction with as little play as possible or without play. Preferably the opening is of a cross-section which in particular (radially inwardly) becomes larger towards the opening and which permits a pivotal movement in the angle between the entrainment member and the arm of the coupling ring. Tilting as between the entrainment member and the coupling ring is effectively avoided by virtue of that widened opening.

In a further preferred configuration the coupling ring has an at least substantially central through opening. By virtue of the central through opening the applicant is capable of passing material through the chuck.

In a further preferred configuration the first rocker and the second rocker are arranged rotatably on a respective slider. Preferably the sliders are respectively coupled to a piston or a traction guide and are moveable synchronously, in particular radially, towards and away from each other. The traction guide provides for positive synchronization of the sliders in the clamping movement. In the case of a clamping movement without contact in relation to the workpiece or other obstacles, the rocker in this configuration is not pivoted, which leads to a uniform movement of all entrainment members and thus all clamping jaws. It is only when a first obstacle like for example the workpiece is encountered that a pivotal movement of the rocker relative to the slider moves the entrainment member associated therewith with different motion components from the other entrainment member arranged at same, which results in an unequal movement of the clamping jaws. A synchronous counterpart movement of the respective diametrally opposite entrainment members on the other rocker is implemented by means of the coupling ring. As a result at any moment in time in compensation movements or in a clamping movement of the chuck, that is not a compensation movement, centricity is ensured relative to the clamping axis.

The first and second rockers are preferably respectively pivotable about an axis of rotation parallel to the clamping axis.

The entrainment members are respectively preferably guided linearly moveably in the housing.

In a preferred embodiment respective mutually diametrally opposite entrainment members are guided parallel to each other while further preferably respectively adjacently arranged entrainment members are guided at a right angle to each other. The configuration of the entrainment members which are guided in opposite parallel relationship, in combination with the entrainment guide which are oriented in adjacent right-angled relationship with each other provides for a favorable kinematics of the chuck with at the same time minimized structural space.

In a preferred embodiment the entrainment members on the rocker respectively associated therewith are respectively coupled by means of a rotor mounted rotatably on the rocker. The respective rotor is preferably moveable linearly guided relative to the entrainment member associated therewith. In a particularly preferred configuration the respective rotor and the entrainment member associated therewith are displaceable relative to each other at a right angle to the guidance direction of the entrainment member in the housing.

In a further preferred configuration of the compensation chuck the first entrainment member has a first preferably radially oriented arm engaging into a first opening in the coupling ring and wherein the second entrainment member has a preferably radially oriented arm engaging into a second opening in the coupling ring. In that alternative configuration therefore the entrainment members do not have openings into which the coupling ring extends, but the coupling ring has corresponding openings into which projections from the entrainment members extend. In this embodiment the compensation chuck can be combined in the same manner with the other preferred embodiments described hereinbefore, like the embodiment in which the arms of the coupling ring engage into corresponding openings in the entrainment members.

BRIEF DESCRIPTION OF THE DRAWINGS

The invention is described in greater detail hereinafter by means of the preferred embodiments by way of example and with reference to the accompanying Figures in which.

DETAILED DESCRIPTION

Figure 1:
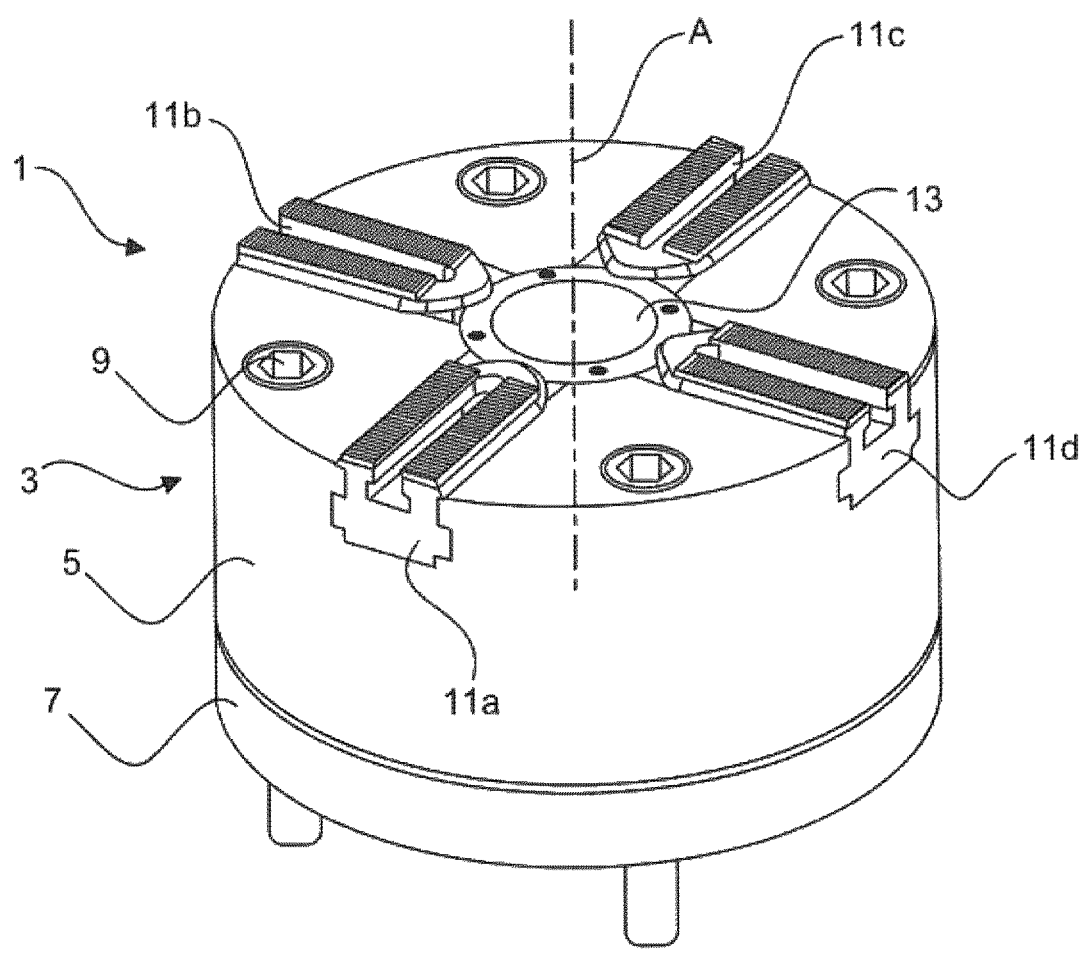
FIG. 1 shows a compensation chuck according to a preferred embodiment.

The compensation chuck 1 according to the invention is shown in the assembled state in FIG. 1. The chuck 1 has a housing 3 which is subdivided into a chuck body 5 and a cover plate 7. A total of four base jaws 11a-d are received in linearly guided relationship in the chuck body. The base jaws 11a-d are preferably oriented in radially guided relationship moveably with respect to a clamping axis A. The chuck body 1 further has a sealing tube 13 which is introduced substantially centrally into the chuck body 5. The chuck body 5 is connected to the cover plate 7 by means of a plurality of screws 9.

Figure 2:
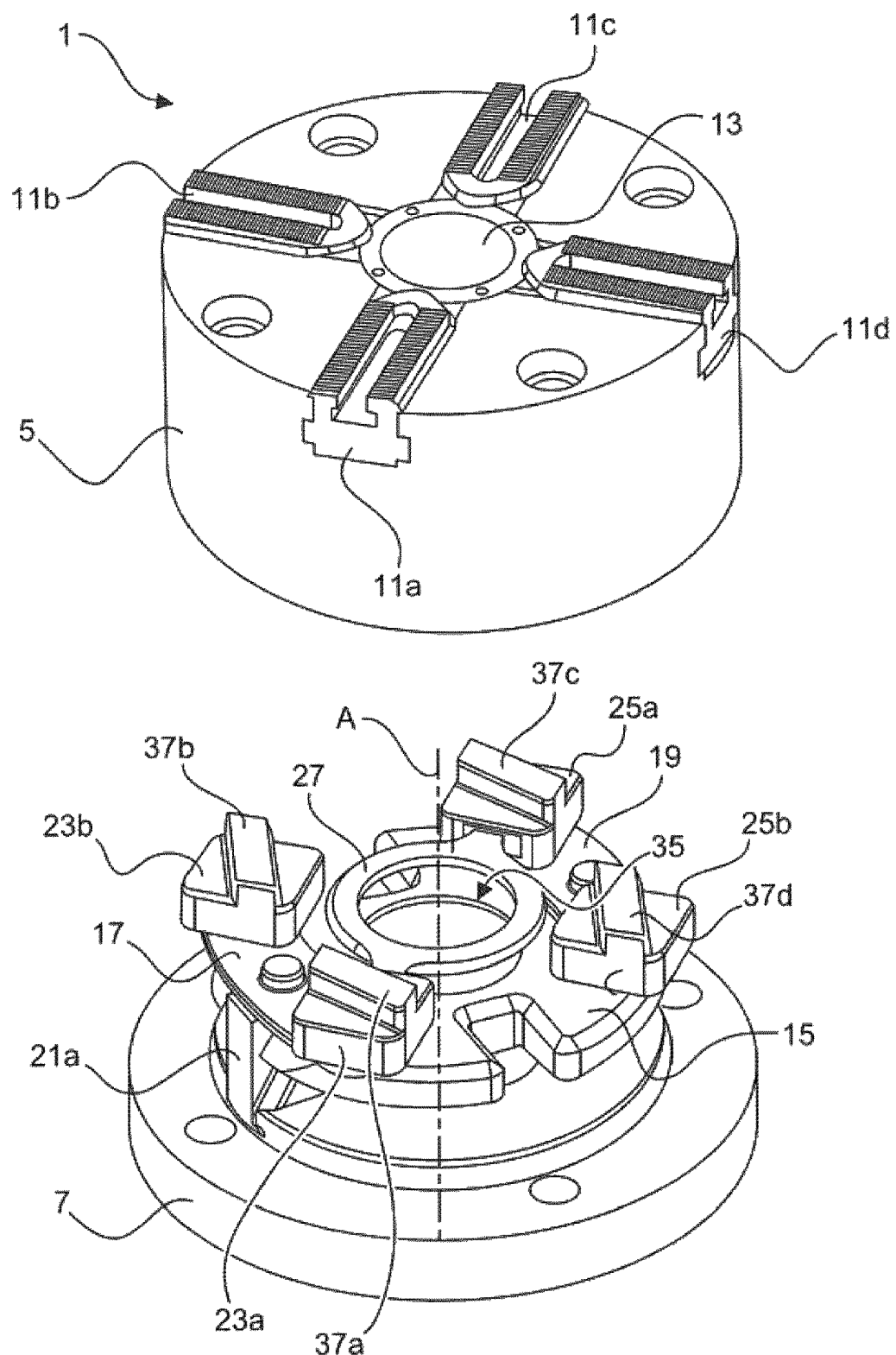
FIG. 2 shows an exploded or part-assembled state of the compensation chuck of FIG. 1, with the chuck body lifted off the cover plate.

In the view in FIG. 2 the chuck body 5 is lifted off the cover plate 7 and therewith also the sealing tube 13 and the base jaws 11a-d. That reveals the constituent parts of a drive unit 10 of the chuck 1. In its interior the chuck 1 has a piston 15 which cooperates with a traction tube of a power clamping device for clamping and unclamping purposes.

Figure 3:
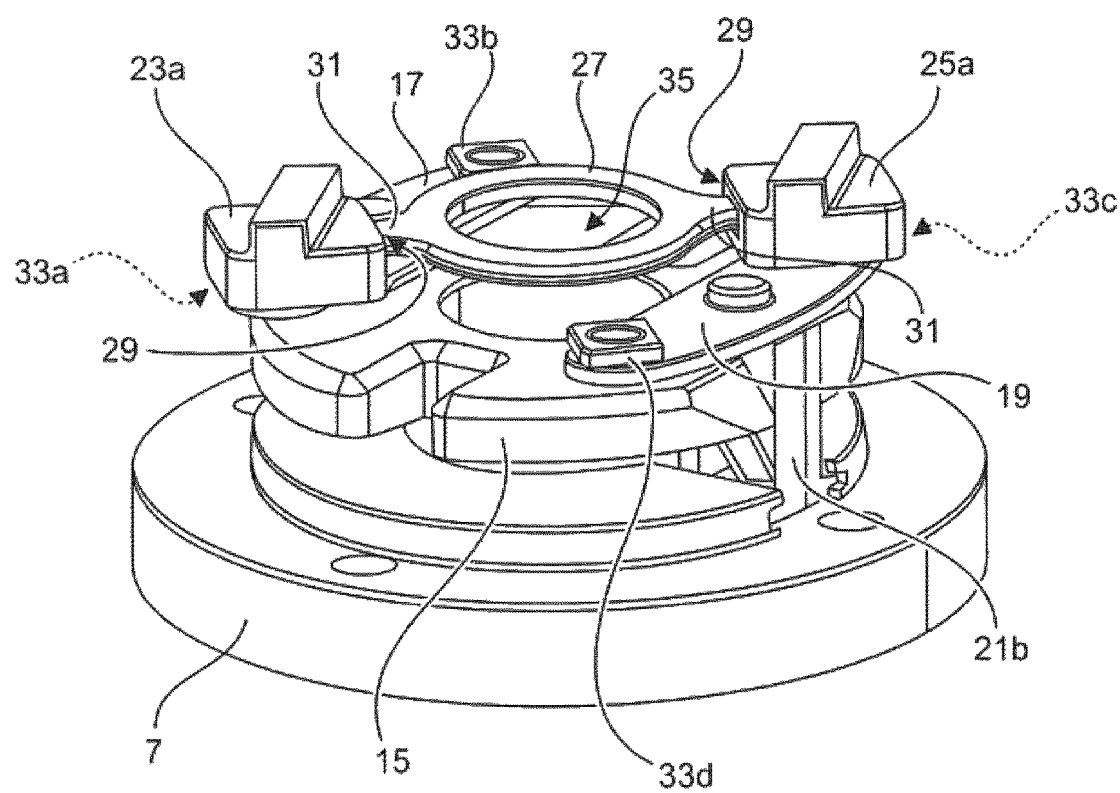
FIG. 3 shows a perspective view with further details of the cover plate of the compensation chuck of FIG. 1, and FIGS. 4a through 4e show various diagrammatic partial views of the compensation chuck of FIGS. 1 through 3 in different operating states, more particularly.

The piston 15 is disposed in engagement with two diametrally oppositely arranged sliders 21a, 21b (see also FIG. 3) which respectively bear against each other with a slide surface inclined relative to the clamping axis A.

Arranged rotatably on the first slider 21a is a first rocker 17, also referred to as a bridge member. A second rocker 19 is arranged rotatably on the second slider 21b (see FIG. 3). The axes of rotation of the first and second rockers 17, 19 are oriented parallel to the clamping axis A.

Two entrainment members 23a, 23b are arranged on the first rocker. Two entrainment members 25a, 25b are arranged on the second rocker 19.

The chuck 1 has a coupling ring 27 which is arranged centrally rotatably about the clamping axis A and which is operatively connected to a first entrainment member 23a of the first rocker 17, and to a second entrainment member 25a of the rocker 19, that is arranged in diametrally opposite thereto. The coupling ring 27 is adapted to synchronize the entrainment members 23a, 25a in the direction of rotation, to guide them, but has a motion play in relation to the entrainment members 23a, 25a in the radial direction relative to the clamping axis A. As a consequence of the synchronized rotary movement about the clamping axis A the first and second rockers 17, 19 also move in positively synchronized relationship in the same direction.

The first and second entrainment members 23a, 25a each have a respective opening 29, within which a respective arm 31 of the coupling ring 27 is accommodated displaceably, in particular slidingly.

The entrainment members 23a, 23b and 25a, 25b are respectively coupled to the first and second rockers 17, 19 by means of a rotor 33*a-d*, wherein the rotor is respectively mounted slidingly in the entrainment member 23*a*, 23*b*, 25*a*, 25*b* associated therewith.

The coupling ring 27 has a central opening 35 which preferably extends coaxially with respect to the clamping axis A and is adapted to receive the sealing tube 13.

The entrainment members 23*a*, 23*b*, 25*a*, 25*b* each have respective projections 37*a-d* which are adapted to engage into corresponding sliding guides in the base jaws 11*a-d* in order to convert a thrust movement produced by the entrainment members 23*a*, 23*b*, 25*a*, 25*b* into the radial movement of the base jaws 11*a-d*.

More detailed information relating to the motion relationships of the compensation chuck according to the invention in accordance with the preferred embodiment will be apparent from FIGS. 4*a* through 4*e*.

Figure 4A:
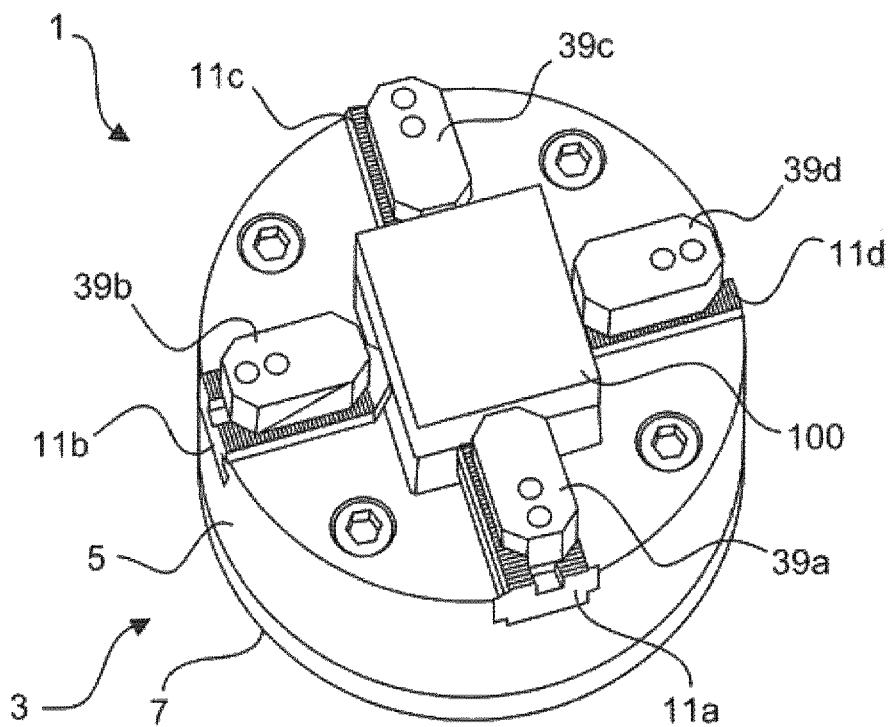
FIG. 4a illustrates a workpiece to be clamped located on the compensation chuck.

FIG. 4*a* firstly shows a workpiece 100 which is to be clamped centrically between four clamping jaws 39*a-d* with the chuck 1. The clamping jaws 39*a-d* are coupled to the base jaws 11*a-d* in generally known fashion.

Figure 4B:
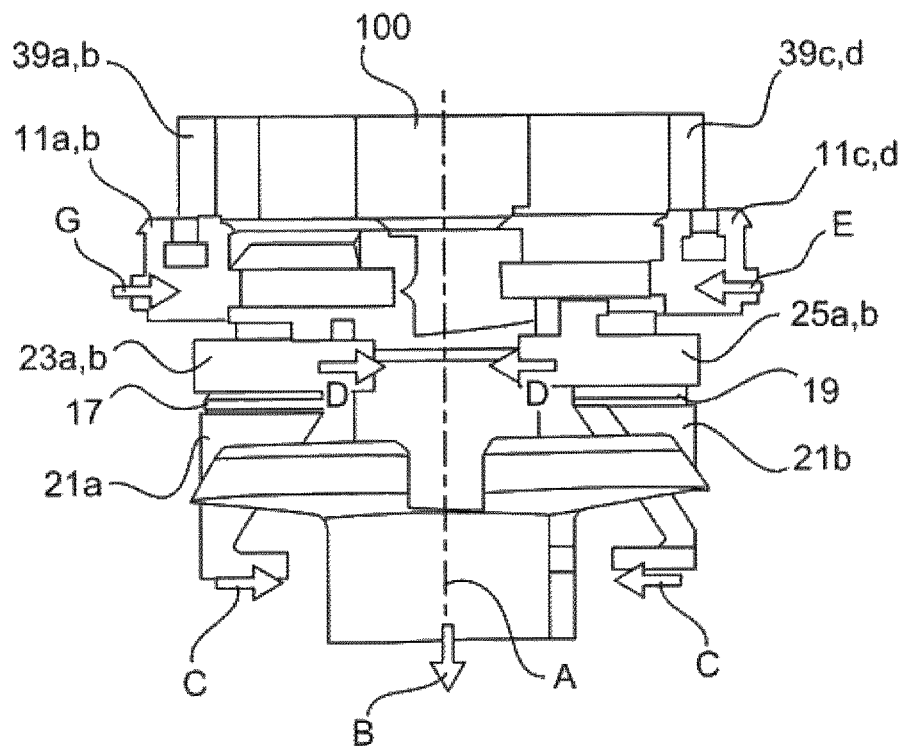
FIG. 4b illustrates initial movements for a clamping operation at the compensation chuck.

If a clamping operation is to be initiated starting from the state shown in FIG. 1 then the drive unit must be initiated by moving a traction tube in the direction of the arrow B (FIG. 4*b*). As a consequence of the movement in the direction of the arrow B the piston 15 is pulled down in the direction of the clamping axis A whereby the first and second sliders 21*a*, 21*b* are moved towards each other in the direction of the arrows C. With the sliders 21*a*, 21*b* the rockers 17, 19 are also moved towards each other in the direction of the arrows D, or a force is transmitted to the rockers 17, 19 in the direction of the arrows D. By means of the rockers, a force is transmitted to the entrainment members 23*a*, 23*b*, 25*a*, 25*b*, whereby in turn transmission of force can be effected in the radial direction towards the clamping axis A (arrows E) on the base jaws 11*a-d* and thus on the clamping jaws 39*a-d* and the workpiece 100.

Figure 4C:
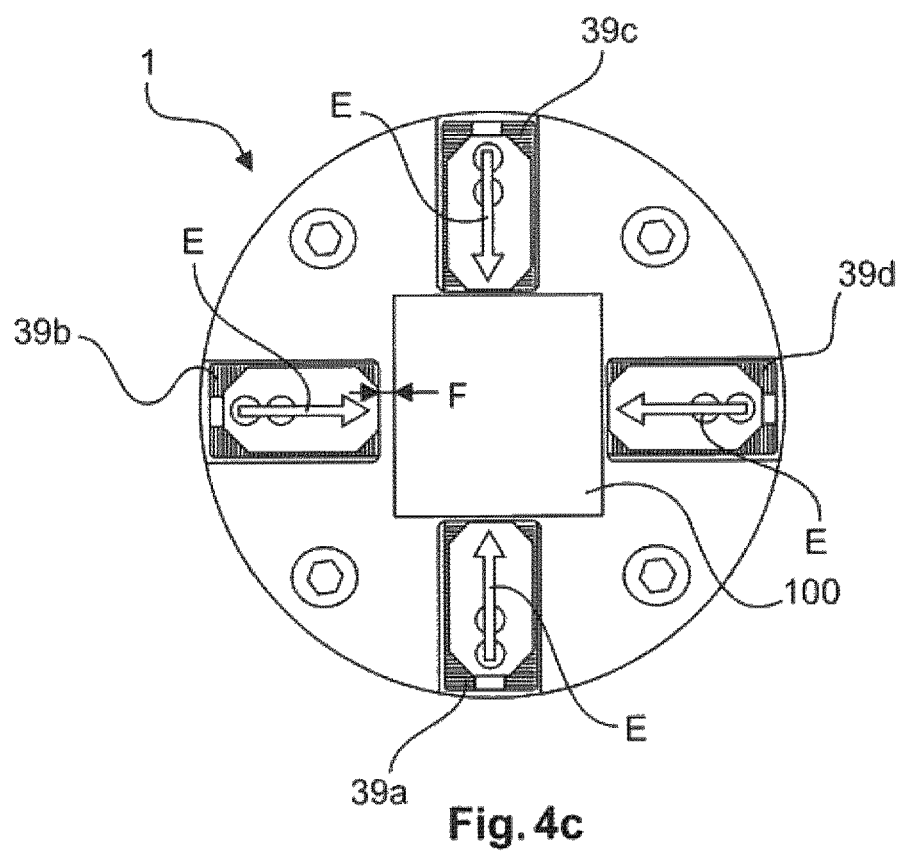
FIG. 4c illustrates a state in which one or more clamping jaws contact the workpiece while at least one other clamping jaw remains at a gap from the workpiece.
Figure 4D:
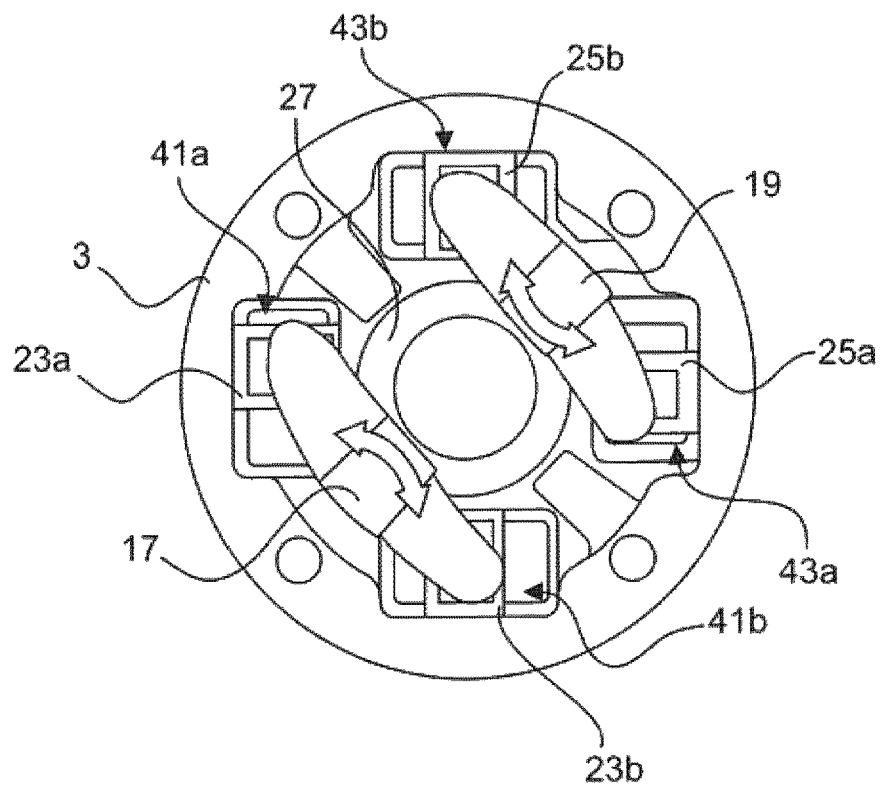
FIG. 4d illustrates a further traction movement of the piston in the compensation chuck to pivot the rockers from the position shown in FIG. 4c.

As a consequence of the transmission of force the clamping jaws 39*a-d* are moved towards the workpiece 100 until one or more clamping jaws contact the workpiece. FIG. 4*c* shows a state in which the clamping jaws 39*a*, 39*c* and 39*d* bear against the workpiece 100, but a gap F still remains between the clamping jaw 39*b* and the workpiece 100. Upon a continued traction movement of the piston 15, and this is indicated in FIG. 4*d*, the first and second rockers 17, 19 are pivoted. The entrainment members 23*a* and 23*b* are guided at a right angle to each other in the housing 3. In the illustrated orientation the entrainment member 23*a* is guided vertically while the entrainment member 23*b* is moveably guided horizontally. The rotors are respectively guided at a right angle thereto in an opening 41*a*, 41*b*. The entrainment members 23*a*, 23*b* are moved relative to each other as a consequence of the pivotal movement of the first rocker.

The symmetrically mutually oppositely arranged entrainment members 25*a*, 25*b* are respectively linearly moveably guided parallel to the entrainment members of the first rocker, arranged in diametrically opposite relationship thereto, in the housing. The entrainment members 25*a*, 25*b* each have an opening arranged at a right angle relative to their guidance for guiding the opening 43*a*, 43*b* to guide the rotors associated therewith. By virtue of the coupling of the entrainment member 23*a* to the entrainment member 25*a* by means of the coupling ring 27 the second rocker 19 is pivoted in the same direction to the first rocker 17.

By virtue of the paired dependency of the entrainment members 23*a*, 23*b* and 25*a*, 25*b*, starting from the state shown in FIG. 4*c*, the two clamping jaws 39*b*, 39*d* are moved further towards each other because the gap F still has to be compensated. The base jaws 39*a*, 39*b* which were already previously in contact ensure that while this is happening the workpiece is held centrically with respect to one of the two main axes while the two base jaws 39*b*, 39*d* bring about centricities of the other main axis. By virtue of the guiding arrangement of the entrainment members 23*a*, 23*b*, 25*a*, 25*b* relative to the rockers 17, 19 and thus the sliders 21*a*, 21*b*, they can be still further moved towards each other, in spite of the base jaws 39*a*, 39*c* bearing against the workpiece 100, when the traction movement is continued.

Figure 4E:
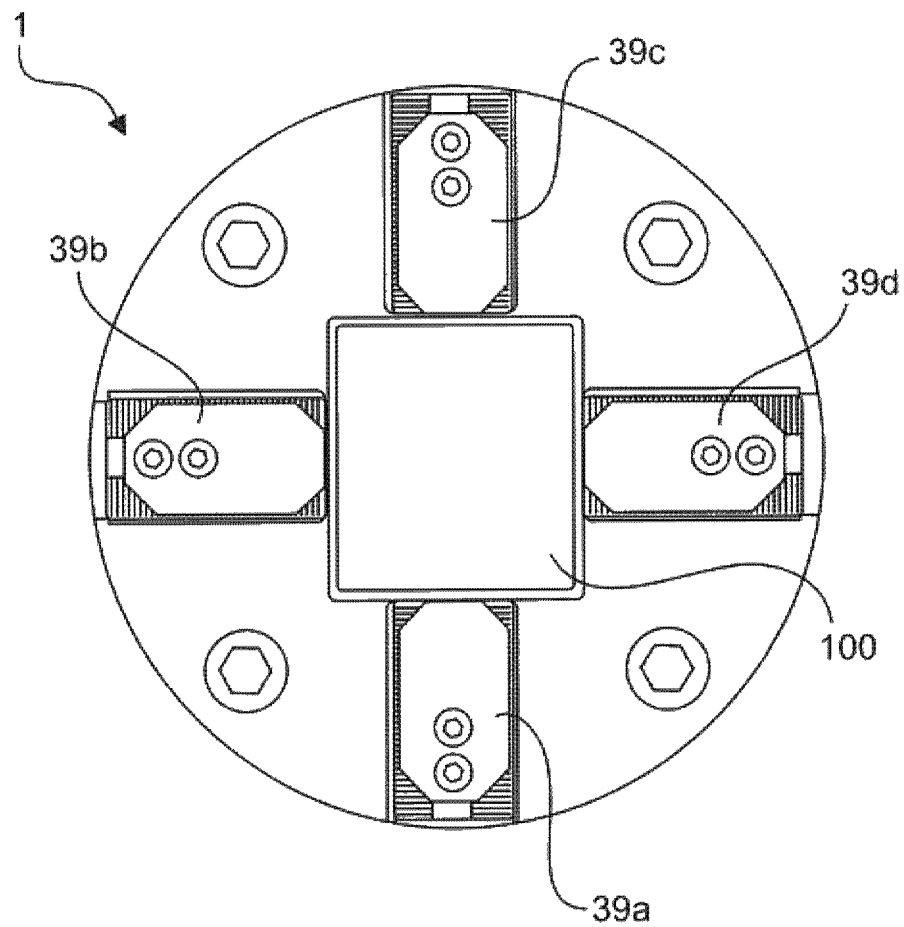
FIG. 4e illustrates a final clamped state at the compensation chuck.

In that way the clamping operation is centrically continued until reaching the final state shown in FIG. 4*e*, in which the workpiece 100 is held in the chuck 1 on all four sides centrically by the clamping jaws 39*a-d*.

As can be clearly seen from the foregoing description the compensation chuck according to the invention provides a mechanically robust and easily implementable option for providing a compensation function in relation to four-jaw chucks.

The forgoing is merely preferred embodiments of the present invention and not intended to limit the patent scope of the present invention, and any equivalent structures or equivalent flow variations made by using the description and accompanying drawings of the present invention, no matter whether it is directly or indirectly used in any other related technical field, should be included within the protection scope of the present invention.

What is claimed is:

1. A compensation chuck for centrically clamping workpieces comprising:
   a housing,
   two pairs of mutually diametrally opposite base jaws for receiving corresponding clamping jaws,
   a drive unit which is moveable by power clamping having two pairs of drivable entrainment members, wherein two adjacent entrainment members are respectively coupled together by a first rocker and two further adjacent entrainment members are coupled together by a second rocker, and
   a coupling ring which guides a first entrainment member and a diametrally opposite second entrainment member in the peripheral direction tangentially relative to a clamping axis (A), wherein a motion play is provided between the entrainment members and the coupling ring in the radial direction.

2. The compensation chuck as set forth in claim 1, wherein the coupling ring is arranged in the housing rotatably about the clamping axis (A).

3. The compensation chuck as set forth in claim 1, wherein the coupling ring has a first radially oriented arm engaging into an opening in the first entrainment member and a second radially oriented arm engaging into an opening in the second entrainment member.

4. The compensation chuck as set forth in claim 1, wherein the coupling ring has an at least substantially central through opening.

5. The compensation chuck as set forth in claim 1, wherein the first rocker and the second rocker are arranged rotatably on a respective slider.

6. The compensation chuck as set forth in claim 5, wherein the sliders are coupled to a piston and are moveable synchronously, in particular radially, towards and away from each other.

7. The compensation chuck as set forth in claim 1, wherein the first and second rockers are respectively pivotable about an axis of rotation parallel to the clamping axis (A).

8. The compensation chuck as set forth in claim 1, wherein the entrainment members are respectively guided to be linearly moveable in the housing.

9. The compensation chuck as set forth in claim 8, wherein respective mutually diametrally opposite entrainment members are guided parallel to each other.

10. The compensation chuck as set forth in claim 9, wherein respective adjacently arranged entrainment members are guided at a right angle to each other.

11. The compensation chuck as set forth in claim 1, wherein the entrainment members are respectively coupled to the first and second rockers respective rotors mounted rotatably on the first and second rockers rocker.

12. The compensation chuck as set forth in claim 11, wherein the respective rotor and the entrainment member associated therewith are linearly guidedly moveable relative to each other.

13. The compensation chuck as set forth in claim 12, wherein the respective rotor and the entrainment member associated therewith are displaceable relative to each other at a right angle to a direction of guidance of the entrainment member in the housing.

14. The compensation chuck as set forth in claim or claim 1, wherein the first entrainment member has a first radially oriented arm engaging into a first opening in the coupling ring and wherein the second entrainment member has a radially oriented arm engaging into a second opening in the coupling ring.

* * * * *

UNITED STATES PATENT AND TRADEMARK OFFICE
CERTIFICATE OF CORRECTION

PATENT NO.        : 10,166,610 B2
APPLICATION NO.   : 15/551358
DATED             : January 1, 2019
INVENTOR(S)       : Volker Henke Page 1 of 1

It is certified that error appears in the above-identified patent and that said Letters Patent is hereby corrected as shown below:

In the Claims

At Claim 11, Column 7, Lines 16-17, read "to the first and second rockers respective rotors mounted rotatably on the first and second rockers rocker." and should read -- to the first and second rockers by respective rotors mounted rotatably on the first and second rockers. --

At Claim 14, Column 7, Line 27, reads "14. The compensation chuck as set forth in claim or claim" and should read -- 14. The compensation chuck as set forth in claim --

Signed and Sealed this
Nineteenth Day of February, 2019

Andrei Iancu
*Director of the United States Patent and Trademark Office*